F. A. NEIDER.
TOP PROP.
APPLICATION FILED JUNE 15, 1908.
956,722.
Patented May 3, 1910.
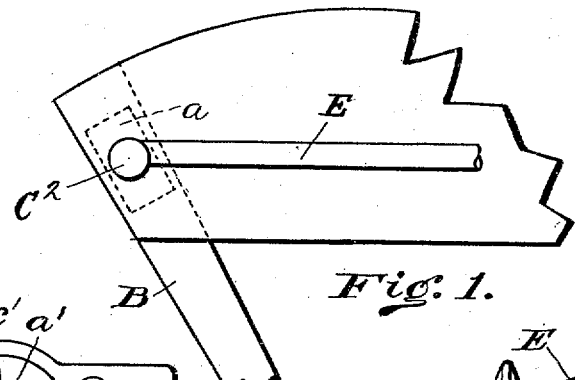
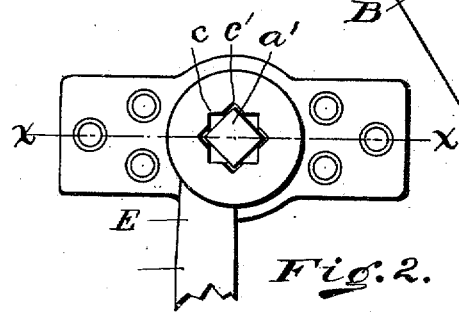
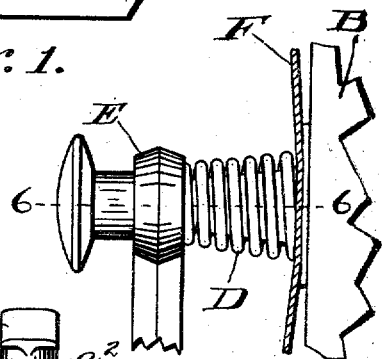
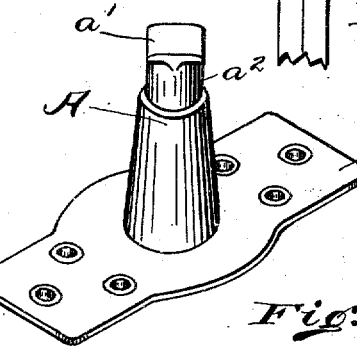
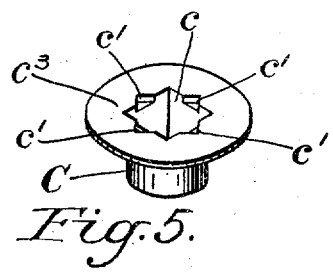
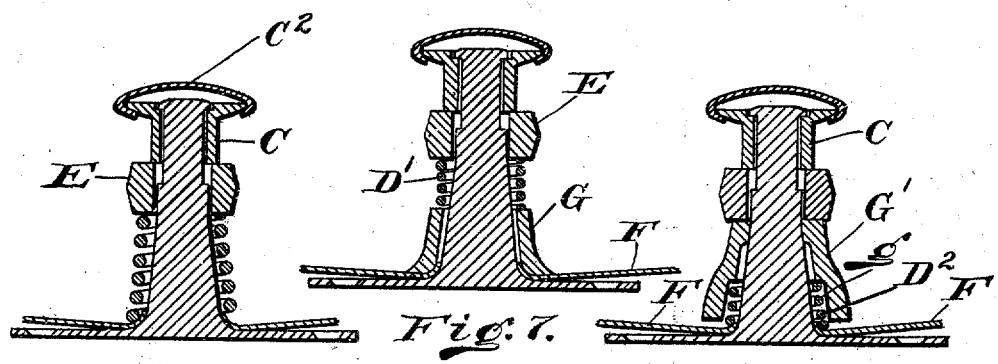
Witnesses
C. W. Miles
A. McCormack
Inventor
Fred A. Neider
By Walter D. Murray
Attorney

UNITED STATES PATENT OFFICE.

FRED A. NEIDER, OF AUGUSTA, KENTUCKY.

TOP-PROP.

956,722.      Specification of Letters Patent.      Patented May 3, 1910.

Application filed June 15, 1908. Serial No. 438,448.

*To all whom it may concern:*

Be it known that I, FRED A. NEIDER, a citizen of the United States of America, and resident of Augusta, county of Bracken, State of Kentucky, have invented certain new and useful Improvements in Top-Props, of which the following is a specification.

The object of my invention is to provide a top prop wherein the cover of the carriage top and the top prop or brace are secured readily upon the stud without screw-threads and in a manner such that the vibration of the vehicle in motion neither loosens the parts nor causes them to rattle.

I will describe the invention first in connection with the accompanying drawings, and then will point it out in the claims.

Referring to the drawings: Figure 1 is a detail side elevation of a part of a vehicle top and the top prop construction embodying my invention. Fig. 2 is a detail side elevation of the stud, the top prop, or brace, and the nut, showing the nut with its cap removed. Fig. 3 is a view in side elevation of the stud, the thimble, nut, and brace, in section of the carriage cover, and in elevation of a part of the carriage bow. Fig. 4 is a perspective view of the stud. Fig. 5 is a similar view of the nut with its cap removed. Fig. 6 is a sectional view taken upon line 6—6 of Fig. 3. Figs. 7 and 8 are similar views of modified forms of the invention.

Referring to the parts: Stud, A, may be secured to the bow, B, in any convenient manner, such as passing it through the bow or securing it to the bow by means of a plate, $a$, which is cast integral with it. Stud, A, is made without screw threads, and at its upper end it has a head, $a'$, which is made of a shape whose contour will not be circular, so that the diameters of said figure will be unequal. Adjacent to the head, $a'$, the stud has a reduced neck, $a^2$. Stud, A, is to be used in conjunction with a nut, C, which has a bore, $c$, of a shape which in cross section corresponds to the shape of the head, $a'$. At the upper end of the bore, $c$, nut, C, has notches, $c'$, which form a seat for the head, $a'$ of the stud. The seat formed by the notches, $c'$, is seen to be disposed at an angle to or out of alinement with the bore, $c$. The nut, C, preferably is completed by means of a cap, $C^2$, which engages a disk, $c^3$, which is formed integral with the nut proper, C.

In the preferred form, illustrated in Figs. 3 and 6, the thimble is made of a conical coiled spring, D, and the top prop rod or brace rod, E, is placed upon the stud, A, between the nut, C, and the spring thimble, D, which bears at its lower end against the leather, F, of the cover.

In the modification shown in Fig. 7, there is a short tapered collar, G, placed about the stud, A, adjacent to the leather, F, and between the collar, G, and the brace rod, E, a coiled spring, D', is placed.

In the modification shown in Fig. 8 the tapered thimble, G', has a recess, $g$, in its lower end into which the conical coiled spring, $D^2$, fits, the parts being arranged with the spring, $D^2$, bearing against the leather, F, and the thimble, G', bearing against the nut, C.

In securing the parts in place, stud, A, having been secured to the bow, B, leather, F, is perforated and placed over the stud.

In the forms shown in Figs. 3 and 6, the conical spring thimble, D, and the brace, E, are then placed over the stud. Nut, C, is then placed with the bore, $c$, engaging the head, $a'$. The parts are made of a proportion such that when the thimble, D, contacts with the leather, F, the brace, E, contacts with the spring thimble, D, and the nut, C, contacts with the brace, E. The head, $a'$, of the stud will be within the bore, $c$, but will not extend to the plane of notches, $c'$. The nut, C, is then pressed inward against the brace, E, so as to bring the head, $a'$, outward beyond the seat formed by the notches, a turn is given to the nut so as to bring the head, $a'$, into alinement with the seat, and the pressure on the nut is released so as to allow the spring, D, to press the nut outward until the head, $a'$, engages the seat. In this position the spring thimble, D, holds the leather, F, firmly in place, holds the brace, E, firmly against rattling, and keeps the head, $a'$, seated securely in the seat formed by the notches, $c'$.

In the modification shown in Figs. 7 and 8 the proportions of the stud to the thimble, the springs, the brace, and the nuts are such that when placed together without tension, the head, $a'$, stands within the bore of the nut within a plane which passes through the seat in the nut. The nut is secured in place by pressing it inward to bring the head beyond the seat and by giving the nut a slight turn, to bring the head to register with the seat. In these two modifications, likewise, it is seen that there is an absence of screw-threads, that the pressure of the coiled spring is communicated both to the leather to hold it in place, to the prop or brace to keep it from rattling and to the nut to keep its seat in engagement with the head of the stud.

What I claim is:

1. The combination of a stud having an integrally formed head, means for securing said stud to a carriage top, a brace rod for the carriage top mounted on said stud, a nut having a seat, adapted to engage the head on said stud, and a coiled spring mounted on said stud for holding said brace rod in place, and for holding the seat on said nut in positive engagement with said head.

2. The combination of a stud having an integrally formed angular head, means for securing said stud to a carriage top, a brace rod mounted on said stud, a nut having an angular bore, corresponding to the shape of said head, and a seat for said head, out of alinement with the bore, and a thimble mounted on said stud for holding said rod in place and for forcing said nut outwardly, whereby said head is caused to engage the seat provided on the nut.

3. In a carriage prop the combination of a member of a carriage top, a stud secured to the member and provided with an integrally formed angular head, a covering material through which the stud projects, a nut provided with an angular bore, corresponding to the shape of the head and having a seat for the head, out of alinement with the bore, a brace rod mounted on the stud, a coiled spring for holding the covering material and said brace rod in place, and for forcing said nut outwardly, whereby the head of the stud is caused to engage the seat provided on the nut.

FRED A. NEIDER.

Witnesses:
ISAAC REYNOLDS,
LEO. G. O'NEILL.